(12) United States Patent
Jäckel et al.

(10) Patent No.: US 7,166,030 B2
(45) Date of Patent: Jan. 23, 2007

(54) TORSIONAL VIBRATION DAMPER

(75) Inventors: Johann Jäckel, Bühlertal (DE); Hartmut Mende, Bühl (DE)

(73) Assignee: LuK Lamellen und Kupplungsbau Beteiligungs KG, Bühl (DE)

(*) Notice: Subject to any disclaimer, the term of this patent is extended or adjusted under 35 U.S.C. 154(b) by 0 days.

(21) Appl. No.: 10/800,154

(22) Filed: Mar. 13, 2004

(65) Prior Publication Data
US 2004/0248654 A1 Dec. 9, 2004

(30) Foreign Application Priority Data
Mar. 13, 2003 (DE) .................................. 103 10 832

(51) Int. Cl.
*F16F 15/134* (2006.01)

(52) U.S. Cl. ..................................... 464/68.9; 464/67.1

(58) Field of Classification Search ............... 464/67.1, 464/68.9; 192/203
See application file for complete search history.

(56) References Cited

U.S. PATENT DOCUMENTS

| | | | | | |
|---|---|---|---|---|---|
| 958,274 | A | * | 5/1910 | Owen | ......................... 464/67.1 |
| 1,889,698 | A | * | 11/1932 | Reed | ..................... 464/67.1 X |
| 2,300,720 | A | * | 11/1942 | Wooldridge | ............... 464/67.1 |
| 4,947,700 | A | * | 8/1990 | Kern et al. | ............. 192/203 X |
| 6,371,857 | B1 | * | 4/2002 | Kono et al. | ............ 464/67.1 X |

\* cited by examiner

*Primary Examiner*—Greg Binda
(74) *Attorney, Agent, or Firm*—Alfred J. Mangels

(57) ABSTRACT

A torsional vibration damper with at least two components that are rotatable relative to each other against the opposition of at least two deformable energy storing elements, such as arcuate coil springs. In order to at least reduce the noise that is generated by the damper, the energy storing elements are connected to each other by at least one coupling device that is designed to ensure that, when one of the energy storing elements is deformed, there results a controlled entrainment of the other energy storing element or elements.

20 Claims, 8 Drawing Sheets

TORSIONAL VIBRATION DAMPER

BACKGROUND OF THE INVENTION

The invention relates to improvements in torsional vibration dampers, especially to improvements in so-called split flywheels, wherein at least two components such as flywheel masses are rotatable relative to each other about a common axis, and such rotation is yieldably opposed by at least two deformable energy storing elements, such as compression coil springs.

DESCRIPTION OF THE RELATED ART

Torsional vibration dampers are normally employed in or in conjunction with clutches in the power trains of motor vehicles. Their purpose is to damp torsional vibrations during engagement and/or disengagement of the clutch. Such actuations of the clutch result in the generation of noise that is particularly undesirable in modern motor vehicles. It has been ascertained that the noise that is generated by presently-known torsional vibration dampers can be highly unpleasant to the operator and/or to other occupants of a motor vehicle.

SUMMARY OF THE INVENTION

An object of the present invention is to provide a novel and improved method of eliminating or at least greatly reducing noise that develops when the rotation of the components (masses) of split flywheels relative to each other is yieldably opposed by deformable energy storing elements, such as compression coil springs.

Another object of the present invention is to provide a novel and improved array of cooperating noise-eliminating or noise-reducing devices for use in the power train of a motor vehicle.

A further object of the invention is to provide a novel and improved torsional vibration damper for use between the torque transmitting output element of the prime mover and the clutch in the power train of a motor vehicle.

An additional object of the invention is to provide a power train that can be utilized in a motor vehicle and that employs a torsional vibration damper of the above-described type.

Still another object of the invention is to provide a novel and improved connecting or coupling arrangement between the energy storing elements in a torsional vibration damper forming part of the power train in a motor vehicle.

A further object of the invention is to provide novel and improved energy storing elements for use in the above-described torsional vibration damper between the rotary output element, such as a camshaft or a crankshaft of a prime mover, and the rotary input element of a gearbox in a power train of a motor vehicle.

Another object of the invention is to enhance the comfort to the occupant or occupants of a motor vehicle.

Briefly stated, in accordance with one aspect of the present invention, a torsional vibration damper is provided that includes a plurality of components, such as the masses of a split flywheel, between the rotary output element of a prime mover and a friction clutch in the power train of a motor vehicle, and that are rotatable relative to each other about a common axis. At least two deformable energy storing elements (e.g., at least two arcuate coil springs) are arranged to yieldably oppose rotation of the components relative to each other, and means are provided for coupling the energy storing elements to each other for controlled entrainment of one of the energy storing elements in response to deformation of the other energy storing element. The other energy-storing element can be arranged to dissipate energy, and the one energy-storing element is or can be arranged to be entrained in response to dissipation of energy by the other energy-storing element.

The coupling means can include at least one first entraining member (e.g., a first projection in the form of a lug or the like) that is in motion-transmitting engagement with one of the energy storing elements, and at least one second entraining member (e.g., a second lug or another suitable projection) that is in engagement with the other of the at least two energy storing elements. Such a torsional vibration damper can further include a substantially circular, disc-shaped carrier element for each of the first and second entraining elements, and a support for the carrier elements. The arrangement can be such that each of the carrier elements is turnable relative to and is in frictional contact with the support. The latter can include a flange that is coupled to at least one of the energy storing elements. At least one of the carrier elements can be centered relative to the support, e.g., in such a way that the at least one carrier element is disposed radially inwardly of the support, or vice versa.

At least one of the energy storing elements can include or constitute a compression coil spring having a plurality of convolutions including two neighboring convolutions, and at least one of the above-mentioned first and second entraining members of the coupling means can be disposed between the two neighboring convolutions of the compression coil spring.

Alternatively, the convolutions of the compression coil spring can include at least one larger-diameter convolution and at least two smaller-diameter convolutions that flank the larger-diameter convolution. The at least one larger-diameter convolution can be disposed between and can be engaged by two sections of the respective entraining member.

In accordance with a further aspect of the present invention, at least one of the energy storing elements can include a compression coil spring having a plurality of convolutions, including a first convolution having a first diameter and two additional convolutions having second diameters greater than the first diameter. The first convolution is disposed between the second convolutions, and one of the entraining members then includes a portion that is disposed radially inwardly at the first convolution and is flanked by the additional convolutions.

At least one of the above-mentioned substantially disc-shaped carrier elements can be made of a metallic sheet material. At least some of the entraining elements can also be made of a metallic sheet material, and such entraining elements can be of one piece with or they can be affixed to the respective carrier element or elements. For example, at least some of the entraining members can include arcuate sections that are affixed to the respective entraining element or elements, such as, for example, by spot welding, and having projections extending substantially radially outwardly from the arcuate sections.

The number of energy storing elements can, but need not, exceed two. For example, each energy storing element can extend along an arc of a times approximately 90°, wherein a is a whole number including one. In accordance with one presently preferred embodiment, each of the energy storing elements extends along an arc of approximately 180° and such (two) energy-storing elements are or can be installed at least substantially diametrically opposite each other.

In accordance with another presently preferred embodiment, the improved damper includes a ring-shaped array of four arcuate coil springs, each extending along an arc of approximately 90°.

The above-mentioned components of the improved torsional vibration damper can include two ring-shaped masses.

The novel features that are considered as characteristic of the invention are set forth in particular in the appended claims. The improved torsional vibration damper itself, however, both as to its construction and modes of assembling, installing, and operating the same, together with numerous additional important and advantageous features and attributes thereof, will be best understood upon consideration of the following detailed description of certain presently preferred specific embodiments, with reference to the accompanying drawings.

DESCRIPTION OF THE PREFERRED EMBODIMENTS

Figure 1:
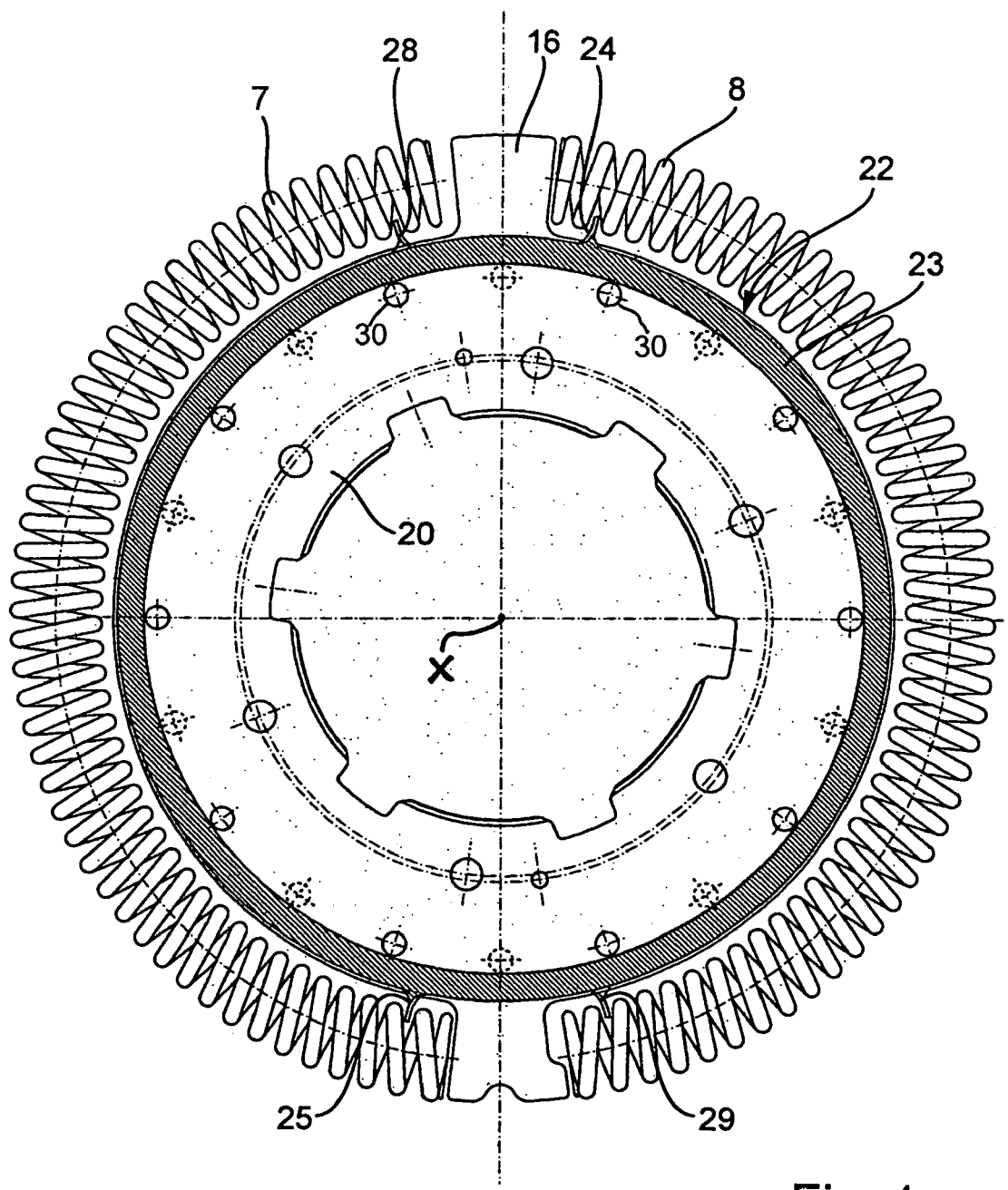
FIG. 1 is an elevational view of an assembled and installed torsional vibration damper embodying one form of the present invention and employing two deformable energy storing elements each extending along an arc of approximately 180°.
Figure 2:
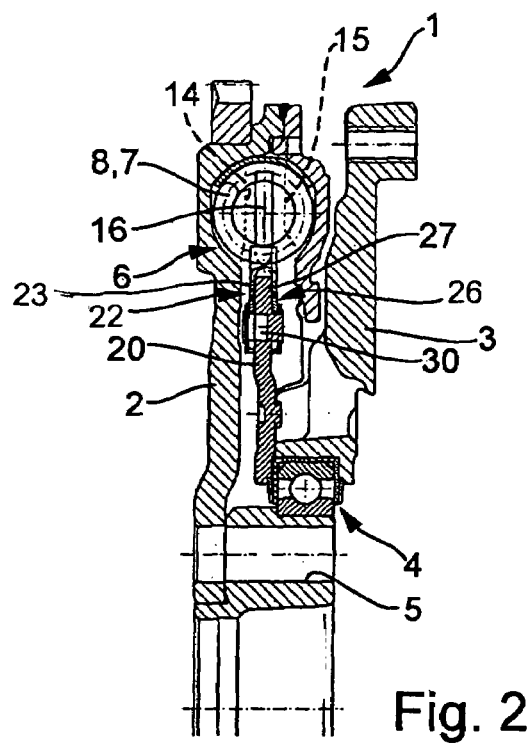
FIG. 2 is a fragmentary axial sectional view of the torsional vibration damper shown in FIG. 1.

The torsional vibration damper, certain parts of which are shown in FIGS. 1 and 2, constitutes a split flywheel 1 including a first or primary component or mass 2 and a second or secondary component or mass 3. The component 2 is affixed to and can receive torque from the rotary output element (such as a crankshaft or a camshaft) of a prime mover (e.g., an internal combustion engine) in the power train of a motor vehicle, and the component 3 can transmit torque to the clutch plate or clutch disc of a friction clutch serving for the transmission of torque to the input shaft of a gearbox in the power train of the motor vehicle. Reference may be had, for example, to commonly owned U.S. Pat. No. 5,042,632 (granted Aug. 27, 1991, to Johann Jäckel for "VIBRATION DAMPING APPARATUS") the disclosure of which is hereby incorporated herein by reference.

The components 2 and 3 are ring-shaped masses and are rotatable relative to each other about a common axis X by way of an antifriction ball bearing 4. The latter is installed radially outwardly of an annular array of bores or holes 5 for screws, bolts, or other suitable fasteners (not shown) that serve to secure the primary component 2 to the rotary output element of the prime mover.

A means 6 for yieldably opposing angular movements of the components 2, 3 relative to each other about the common axis X includes two deformable energy storing elements 7, 8, each of which constitutes an arcuate coil spring having identical or substantially identical convolutions and extending along an arc of a little less than (i.e., close to) 180°. For the sake of brevity, the energy storing elements 7, 8 will also be referred to herein as springs or coil springs; however, it will be appreciated that other suitable resiliently deformable energy storing elements can be utilized with equal or similar advantage. The springs 7, 8 are disposed diametrically opposite each other, and their centers of curvature are located on or close to the axis X.

The components 2 and 3 are respectively provided with abutments 14, 15, and 16 for the coil springs 7 and 8. The abutment 16 is disposed between the abutments 14, 15 (as seen in the direction of the axis X) and is provided on a flange-like torque transmitting support 20 that is affixed to the component 3 by means of bolts, rivets, screws, weldments, and/or other suitable fasteners (not shown). The support 20 serves to transmit torque between the springs 7, 8 and the secondary component 3.

In accordance with a feature of the present invention, the structure of FIGS. 1 and 2 further includes means for coupling the coil springs 7, 8 to each other for controlled entrainment of one of the springs in response to deformation of the other spring. In the structure of FIGS. 1 and 2, the coupling means includes two coupling elements 22 and 26 that, respectively, include at least substantially circular disc-shaped carrier elements 23, 27. Each of those carrier elements is provided with two at least substantially-radially-extending entraining members 24, 25 (on 23) and 28, 29 (on 27).

FIG. 1 shows that the entraining members 24, 25 of the carrier element 23 are disposed at diametrically opposite points or ends of the coil springs 7 and 8, between pairs of neighboring convolutions of the springs 8, 7, respectively. Entraining member 24 is adjacent the abutment 16 and entraining member 25 is adjacent that end portion of the spring 7 that is located diametrically opposite the entraining member 24. The entraining member 28 of the carrier element 27 is located adjacent the abutment 16 on the opposite side of torque transmitting support 20 from entraining member 24, and entraining member 29 is located diametrically opposite entraining member 28 and is adjacent entraining member 25.

As can be seen in FIG. 2, the coupling elements 22, 26 are adjacent and on opposite sides of the flange-like torque-transmitting support 20, which is disposed between the components 2, 3 and is secured to the component 3. Those coupling elements are centered by rivets 30, or by analogous fasteners, that are located radially inwardly of the coil springs 7, 8 and radially outwardly of the antifriction bearing 4.

Experiments that were carried out with the improved torsional vibration damper 6 indicated that the generation of undesirable noise is reduced to a fraction of the noise that is generated by conventional dampers. In the conventional dampers the deformable energy storing elements (such as the arcuate coil springs 7 and 8) are not coupled to each other in a manner already described with reference to the embodiment of FIGS. 1 and 2, and/or in a manner to be described hereinafter with reference to the embodiments shown in FIGS. 3 to 12, and/or in a manner analogous to those actually described in this specification and actually shown in FIGS. 1 through 12. The generation of noise is attributable to unbalance that, in turn, is believed to be attributable to non-uniform dissipation of energy by the various energy storing elements of conventional torsional vibration dampers while a conventional split flywheel is in actual use. By resorting to the coupling means of the present invention, one ensures a controlled entrainment of one of the energy storing elements 7, 8 in response to deformation of the other energy storing element or elements, i.e., a predicable (such as more uniform) dissipation of energy by the other energy storing element(s).

The coupling means in the arrangement of FIGS. 1 and 2 exhibits the additional advantage that it is simple, inexpensive, and compact, all features that are highly desirable in the power train of a motor vehicle. Thus, the novel coupling means employs at least one first entraining member (such as 25) that is associated with the first spring 7, and at least one second entraining member (such as 24) that is associated with the second spring 8. As already described hereinbefore, and as shown in FIG. 1, the entraining members (such as 24 and 25) preferably are or can be located at least substantially diametrically opposite each other. More specifically, the entraining members preferably engage the diametrically opposite end portions of the various energy storing elements. Gradual or constant or uniform dissipation of energy by the energy storing elements—which is achieved as a result of the provision of the novel coupling means—ensures the elimination or pronounced reduction of unbalance.

An important advantage of the preferably circular, disc-shaped, annular carrier elements 23 and 27 is that they allow for convenient installation of the improved coupling arrangement in existing types of torsional vibration dampers. In addition, such carrier elements are simple and inexpensive, they occupy a minimum of space, and they can be made of one piece with the respective entraining members 24, 25 and 28, 29. That simplifies the conversion of a standard split-flywheel-damper combination into the improved combination, i.e., the incorporation of the novel coupling means into the torsional vibration damper, whereby the energy storing elements are coupled to each other in accordance with the present invention.

The above-mentioned flange-like torque-transmitting support 20 constitutes an additional important and highly advantageous feature of the improved torsional vibration damper 6. The carrier elements 23 and 27 are rotatable relative to and are centered relative to the axis of the support 20, and the latter is turnable relative to and is in frictional engagement with the carrier elements 23, 27 and is coupled to the energy storing coil springs 7 and 8.

Those parts of the additional embodiments shown in FIGS. 3 through 12 that are identical with or plainly analogous to the parts of the torsional vibration damper 6 and split flywheel 1 shown in FIGS. 1 and 2 are denoted by similar reference characters and will be described again only to the extent necessary for a complete understanding of the additional embodiments. The torsional vibration damper that embodies the structure of FIG. 3 includes a split flywheel 1 with primary and secondary components or masses 2, 3, and a damper 6 with arcuate deformable energy storing elements 7, 8 in the form of coil springs each extending along an arc of nearly 180°. The coupling elements 32, 36 replace the coupling elements 22, 26 and are centered at the radially outermost portion of the flange-like torque-transmitting support 20. To that end, the coupling elements 32, 36 include at least substantially-radially-extending centering portions or lugs 39 that are adjacent the peripheral surface of the support 20. The coupling elements 32, 36 further respectively include substantially circular (ring-shaped) carrier elements 33, 37, each provided with two entraining members that are functional equivalents of the above-discussed entraining members 24, 25 and 28, 29.

Figure 3:
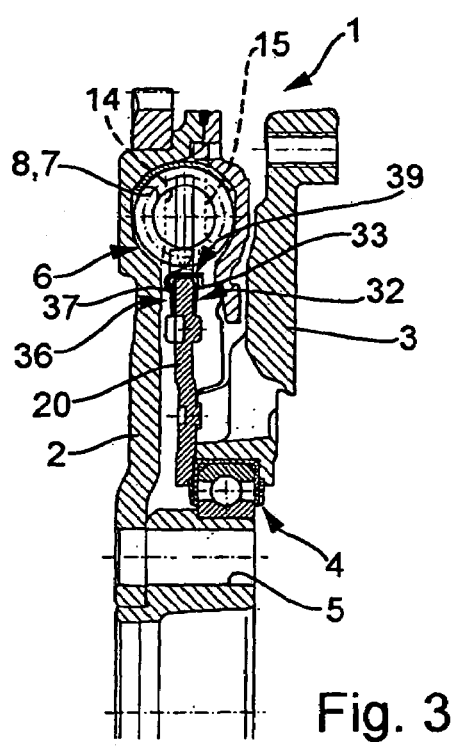
FIG. 3 is a fragmentary axial sectional view of a torsional vibration damper constituting a first modification of the arrangement shown in FIGS. 1 and 2 in that it employs a different form of coupling between the arcuate energy storing elements.

The structure of FIG. 3 can be modified by replacing the centering lugs 39 with centering elements that are located radially inwardly of the respective coupling elements 32, 36, or that are provided on the support 20 and engage and center the radially inner or outer portions of the coupling elements 32, 36 or their carrier elements 33, 37. As already mentioned hereinabove, the support 20 is affixed to one of the components 2 and 3, in this embodiment component 3.

If the radially inner portions of the coupling elements 32, 36 are centered on the support 20, the centering means can include rivets, or the like, that are affixed to the support 20. The illustrated centering lugs 39 can be replaced by or utilized jointly with suitable clips. Centering is desirable and advantageous because it ensures proper guidance of the coupling elements and their carrier elements during turning of the masses 2, 3 and springs 7, 8 relative to each other. Such centering is desirable in all embodiments of the present invention.

An advantage of utilizing coil springs 7, 8 of the type shown in FIGS. 1 to 3 (i.e., wherein the diameters of all convolutions are at least substantially identical) is that they can be standard, mass-produced coil springs.

Figure 4:
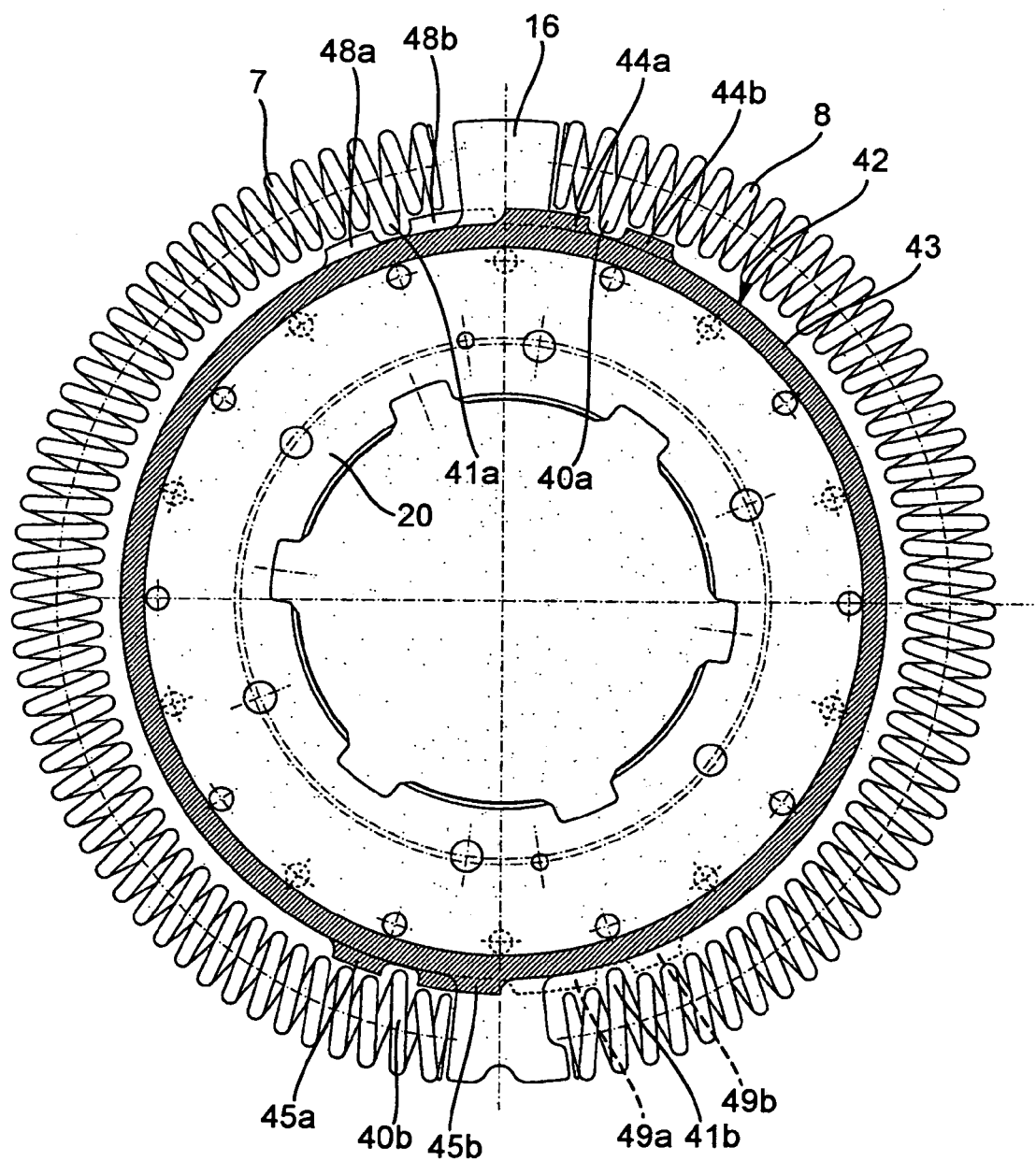
FIG. 4 is an elevational view of an assembled and installed torsional vibration damper constituting a second modification of the damper that is shown in FIGS. 1 and 2.
Figure 5:
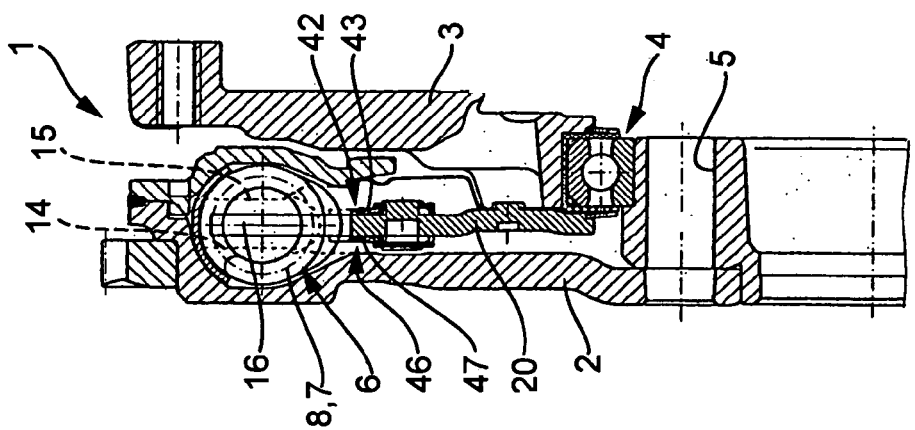
FIG. 5 is a fragmentary axial sectional view of the torsional vibration damper shown in FIG. 4.

FIGS. 4 and 5 illustrate a split flywheel 1 wherein the damper 6 includes two arcuate coil springs 7, 8 each having a plurality of identical or practically identical convolutions as well as two larger-diameter convolutions. The larger-diameter convolutions 40b, 41a of the spring 7 are adjacent its two ends and each such convolution is flanked by two smaller-diameter convolutions. Analogously, the larger-diameter convolutions 40a, 41 b of the coil spring 8 are adjacent the ends of this spring and each such convolution is flanked by two smaller-diameter convolutions.

The larger-diameter convolution 40a of the coil spring 8 has a radially innermost portion that extends between two radially outwardly projecting entraining portions 44a, 44b of a coupling element 42. More specifically, the entraining portions 44a, 44b form part of a substantially circular, ring-shaped carrier element 43 of the coupling element 42. The carrier element 43 is further provided with additional entraining portions 45a, 45b that are located at least substantially diametrically opposite the entraining portions 44a, 44b and flank the larger-diameter convolution 40b of the coil spring 7.

The larger-diameter convolution 41a of the coil spring 7 is flanked by the entraining portions 48a, 48b of a carrier element 47, which further includes entraining portions 49a, 49b flanking the larger-diameter convolution 41b of the coil spring 8.

Figure 7:
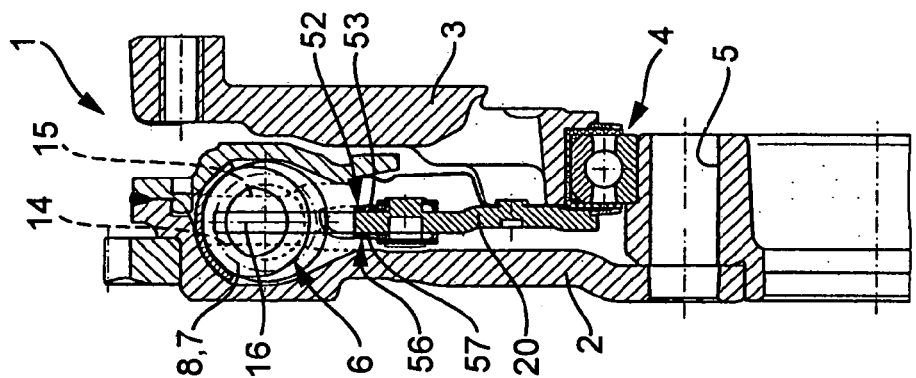
FIG. 7 is a fragmentary axial sectional view of the torsional vibration damper shown in FIG. 6.
Figure 6:
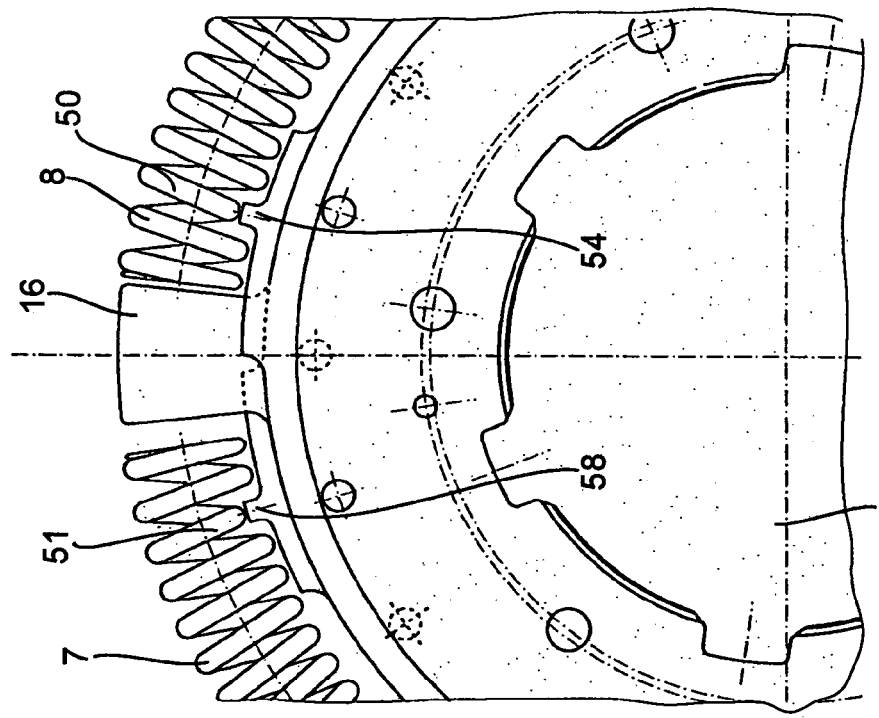
FIG. 6 is a fragmentary elevational view of an assembled and installed torsional vibration damper constituting a further modification of the damper of FIGS. 1 and 2.

The split flywheel 1 of FIGS. 6 and 7 differs from the split flywheel of FIGS. 4 and 5 in that the larger-diameter convolutions 40b, 41a shown in FIG. 4 are replaced with smaller-diameter convolutions (one is shown in FIG. 6, as convolution 51) and in that the larger-diameter convolutions 40a, 41b of FIG. 4 are replaced with smaller-diameter convolutions (one is shown in FIG. 6, as convolution 50). The pairs of entraining portions 48a, 48b and 45a, 45b of FIG. 4 are replaced with single projections 58 (one of which is shown in FIG. 6), and the pairs of entraining projections 44a, 44b and 49a, 49b are replaced by single projections 54 (one of which is shown in FIG. 6).

FIG. 7 shows a coupling element 52 that connects one end portion of the coil spring 8 to the diametrically opposite end of the coil spring 7. The other end portion of the coil spring 8 is connected with the diametrically opposite end of the coil spring 7 by a coupling element 56. The coupling elements 52, 56, respectively, include substantially circular, disc-shaped carrier elements 53, 57 that are installed at opposite sides of the flange-like carrier 20.

The widths of the entraining portions 54, 58 and of the other entraining portions (not shown) in the embodiment of FIGS. 6 and 7 need not exceed the diameter of the wire of which the coil springs 7, 8 are made. That arrangement is desirable and advantageous because the adjacent pairs of larger-diameter convolutions that flank the smaller-diameter convolutions 50, 51 can then come into actual abutment with the smaller-diameter convolutions when the respective coil springs 8, 7 are fully compressed, and without clamping the entraining portions 54, 58 between them.

Figure 8:
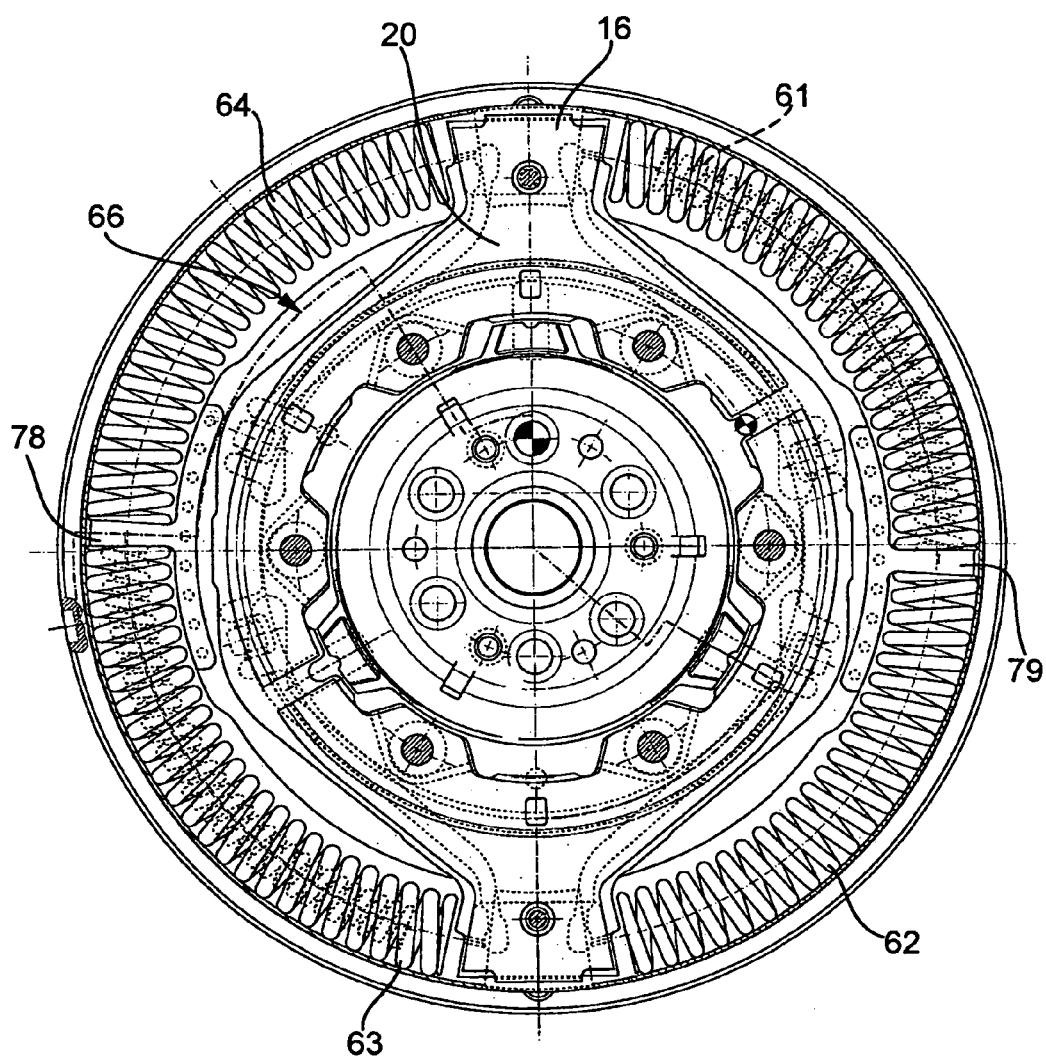
FIG. 8 is an elevational view of an assembled and installed torsional vibration damper that employs more than two deformable energy storing elements in the form of arcuate coil springs.
Figure 9:
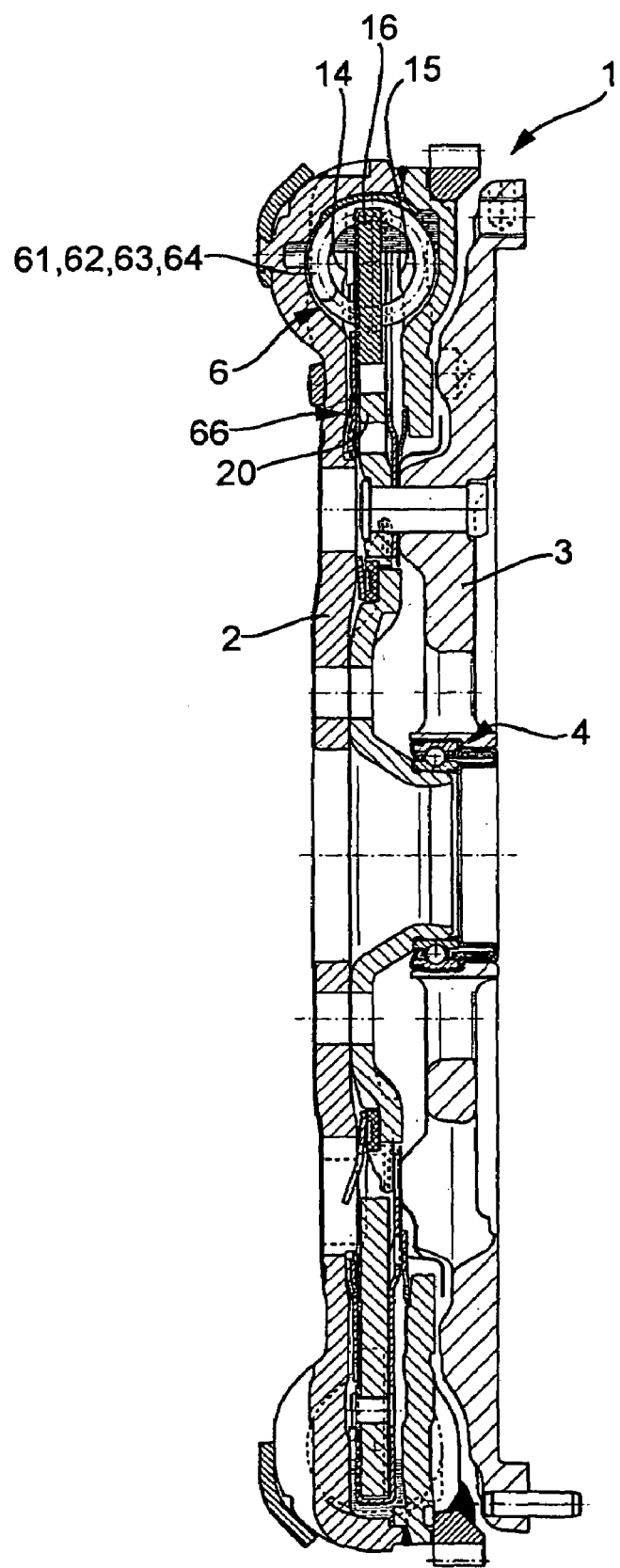
FIG. 9 is an axial sectional view of the torsional vibration damper shown in FIG. 8.

Referring to FIGS. 8 and 9, there is shown a split flywheel 1 that includes a circular array defined by two pairs of compression coil springs 61, 62 and 63, 64, each of which individual springs extends along an arc of somewhat less than 90°. An abutment 16 is provided between the ends of each pair of neighboring coil springs 61, 62; 62, 63; 63, 64; and 64, 61. Coupling elements 66 are installed between the neighboring end portions of the coil springs 61, 62 and 63, 64.

Figure 10:
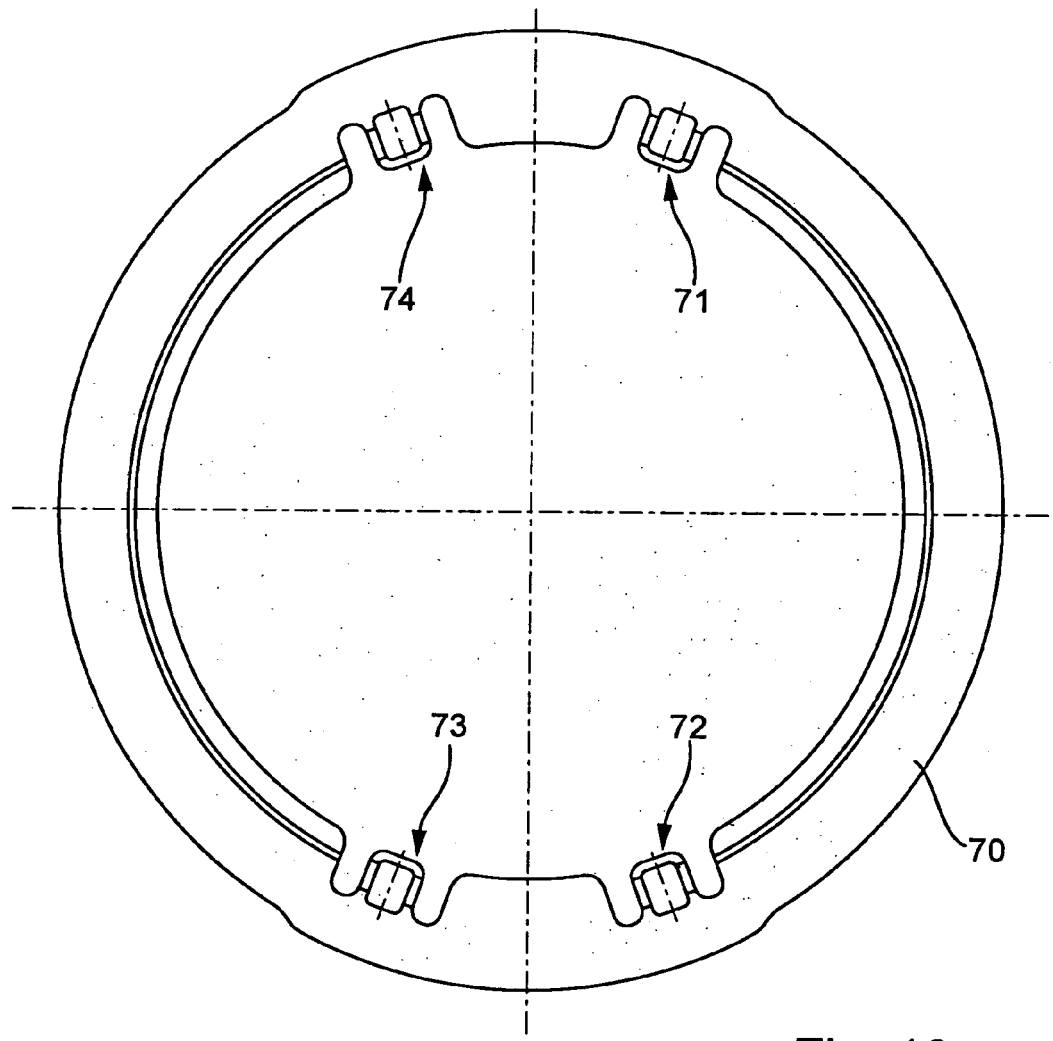
FIG. 10 is an elevational view of a carrier element in the coupling of the torsional vibration damper shown in FIGS. 8 and 9.
Figure 11:
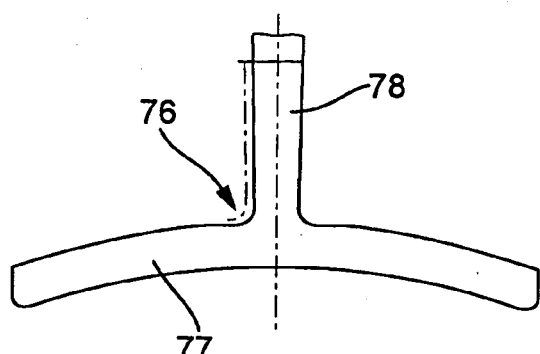
FIG. 11 is an elevational view of one of two entraining elements that can be utilized with the carrier element of FIG. 10 in the torsional vibration damper of FIGS. 8 and 9.
Figure 12:
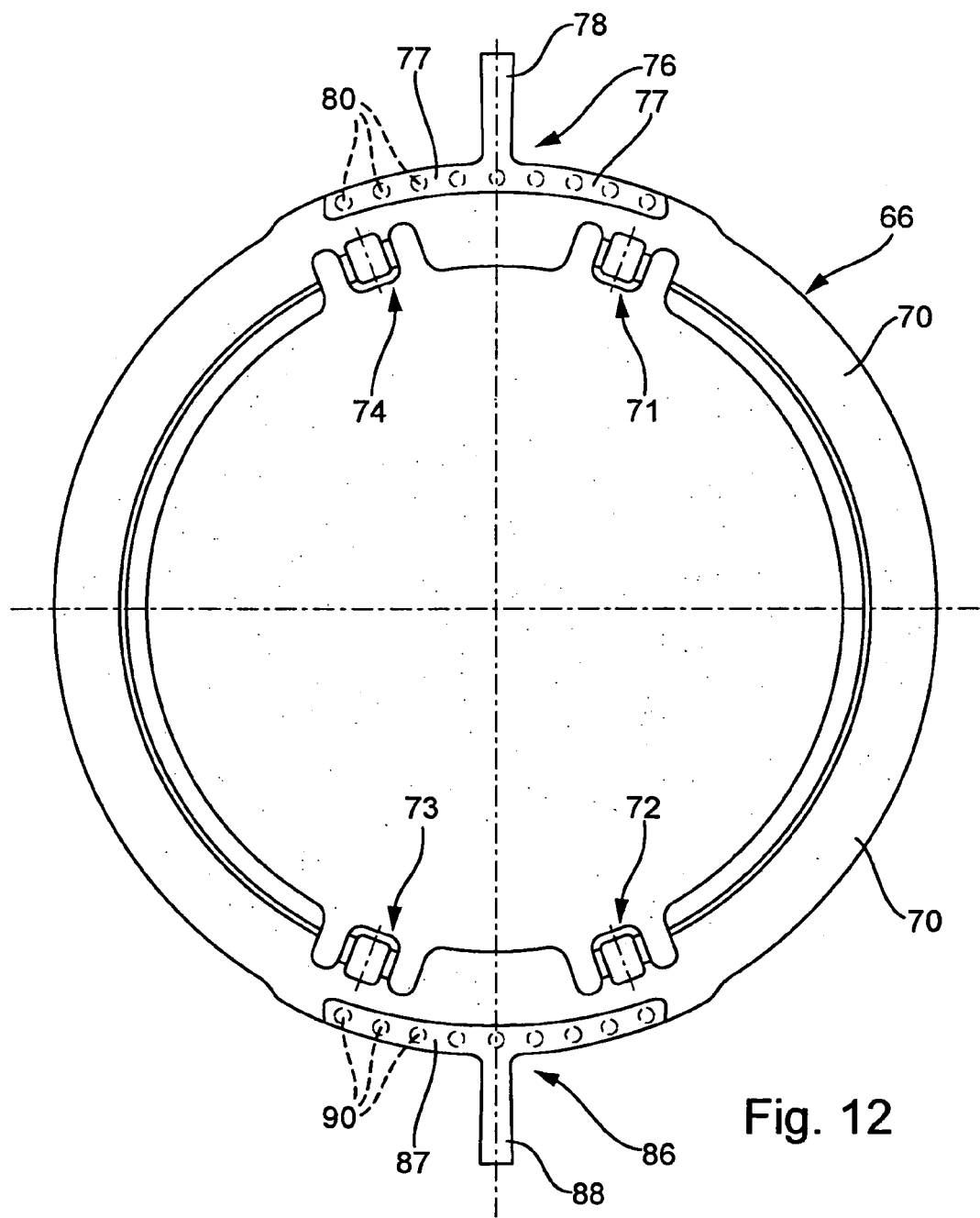
FIG. 12 is an elevational view of the carrier element of FIG. 10 with two entraining elements of the type shown in FIG. 11 affixed thereto.

FIGS. 10 to 12 illustrate the details of one of the coupling elements 66 that are utilized in the structure of FIGS. 8 and 9. That coupling element includes an essentially circular, disc-shaped carrier element 70, the radially inner portion of which is provided with four receptacles or sockets 71, 72, 73, and 74 that form part of a means for centering and for securing the coupling element 66 to the flange-like carrier 20. Each of the receptacles or sockets 71 to 74 includes an inwardly-extending protuberance or lug that is slightly offset relative to the remaining annular body part of the carrier element 70 (as seen in the axial direction). The thus-obtained clearance or space serves to receive the outer marginal portion of the carrier 20.

FIG. 12 shows that the structure of FIGS. 8 and 9 further includes two entraining elements 76, 86 that are secured to the carrier element 70 at least substantially diametrically opposite each other. Those entraining elements respectively include arcuate fastener sections 77, 87 having radially-outwardly-extending, preferably centrally-located projections or stubs 78, 88. The arcuate sections 77, 87 are affixed to the adjacent portions of the carrier element 70. FIG. 12 shows that the sections 77, 87 are spot welded (as at 80, 90) to the adjacent portions of the carrier element 70, namely between the receptacles 71, 74 and 72, 73, respectively.

The carrier element 70 and/or the entraining elements 76, 86 can be made of a suitable metallic sheet material, e.g., of sheet steel. It has been ascertained that, if the carrier element 70 and the entraining elements 76, 86 are made as separate component parts that are thereupon welded, riveted, and/or otherwise reliably secured to each other, the torsional vibration damper including such parts can be produced at a lower cost than a damper that employs one-piece structures embodying the parts 70, 76, 86 shown in FIGS. 10 to 12. It goes without saying that the corresponding portions of the previously described structures (including those shown in FIGS. 1 to 7) can also employ parts that are made of a suitable metallic sheet material. Furthermore, certain features of the embodiment of FIGS. 1–2 can be incorporated into the embodiment of FIG. 3, FIGS. 4–5, FIGS. 6–7, and/or FIGS. 8–12. The same applies for the embodiment of FIG. 3, of FIGS. 4–5, of FIGS. 6–7 and of FIGS. 8–12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above-described contribution to the art of torsional vibration dampers for use in the power trains of motor vehicles and the like. Therefore, such adaptations should and are intended to be comprehended within the meaning and range of equivalence of the appended claims.

What is claimed is:

1. A torsional vibration damper comprising:
a plurality of components rotatable relative to each other about a common axis;
at least two deformable energy storing elements in the form of coil springs arranged to yieldably oppose rotation of said components relative to each other; and
means for operatively coupling corresponding end regions of said coil springs to each other for controlled entrainment of at least one of said coil springs in response to deformation of another of said coil springs, wherein said means for coupling include carrier elements having radially-outwardly-extending entraining members, wherein the entraining members are disposed between neighboring convolutions of said at least two coil springs, and wherein upon deformation of a first coil spring a carrier element operates to simultaneously entrain a second coil spring, whereby the at least two coil springs uniformly dissipate energy.

2. The damper of claim 1, wherein said components form part of a split flywheel.

3. The damper of claim 1, wherein said at least two energy storing elements are arcuate coil springs.

4. The damper of claim 1, wherein the first energy storing element is arranged to store and dissipate energy and said first energy storing element is arranged to be entrained in response to dissipation of energy by the second energy storing element.

5. The damper of claim 1, wherein said carrier elements each include at least one first entraining member that is in motion-transmitting engagement with an end region of one of said energy storing elements, and at least one second entraining member that is in motion-transmitting engagement with an end region of another of said energy storing elements.

6. The damper of claim 5, wherein said carrier elements are substantially circular, disc-shaped, annular components that carry at least one first and at least one second entraining member.

7. The damper of claim 6, including a support for said carrier elements, wherein each of said carrier elements is turnable relative to and in frictional contact with said support.

8. The damper of claim 7, wherein said support includes a flange abutting an end of at least one of said energy storing elements.

9. The damper of claim 7, wherein at least one of said carrier elements is centered relative to a longitudinal axis of said support.

10. The damper of claim 9, wherein each of said carrier elements includes a radially inner and a radially outer portion, one of said radially inner and outer portions being centered relative to said support.

11. The damper of claim 5, wherein at least one of said energy storing elements includes a compression coil spring having a plurality of convolutions including two neighboring convolutions, wherein at least one of said first and second entraining members is disposed between said neighboring convolutions of said coil spring.

12. The damper of claim 5, wherein at least one of said energy storing elements includes a compression coil spring having a plurality of convolutions including at least one larger-diameter convolution and at least two smaller-diameter convolutions flanking said at least one larger-diameter convolution, at least one of said first and second entraining members including first and second coupling elements each having two spaced-apart entraining portions for the at least one larger-diameter convolution of said compression coil spring, said at least one larger diameter convolution being disposed between and being engaged by said entraining portions of the respective coupling element.

13. The damper of claim 5, wherein at least one of said energy storing elements includes a compression coil spring having a plurality of convolutions including a first convolution having a first diameter and two additional convolutions having second diameters greater than said first diameter, said first convolution being disposed between said second convolutions, and one of said entraining members including a portion disposed radially inwardly at said first convolution and flanked by said additional convolutions.

14. The damper of claim 5, further including a substantially circular carrier element for each of said first and second entraining members, at least one of said carrier elements formed at least in part of a metallic sheet material, and wherein at least one of said entraining members is formed of a metallic sheet material.

15. The damper of claim 14, wherein said at least one entraining member includes a substantially arcuate section affixed to said at least one carrier element and a projection extending substantially radially outwardly from said substantially arcuate section.

16. The damper of claim 1, wherein the number of said energy storing elements exceeds two.

17. The damper of claim 1, wherein each of said energy storing elements extends along an arc of approximately n times 90°, n being a whole number including one.

18. The damper of claim 1, wherein each of said energy storing elements extends along an arc of about 180 and said energy storing elements are disposed at least substantially diametrically opposite each other.

19. The damper of claim 1, wherein each of said components is a ring-shaped mass.

20. A torsional vibration damper comprising:
a plurality of components rotatable relative to each other about a common axis;
at least two deformable energy storing elements in the form of coil springs arranged to yieldably oppose rotation of said components relative to each other; and
means for operatively coupling corresponding end regions of said coil springs to each other for controlled entrainment of at least one of said coil springs in response to deformation of another of said coil springs, wherein said means for coupling include carrier elements, wherein upon deformation of a first coil spring a carrier element operates to simultaneously entrain a second coil spring, whereby the at least two coil springs uniformly dissipate energy, wherein the at least two coil springs are disposed in spaced, end-to-end relationship in an annular array about a common axis, and wherein corresponding end regions of the at least two coil springs are interconnected by radially-outwardly extending entraining members of a carrier element and that extend between a pair of adjacent end region coil convolutions of each spring to cause the at least two coil springs to compress simultaneously and to decompress simultaneously.

* * * * *